[84.]

Lysander L. Haworth's
Stop on the Cord,
FOR CHECK-ROWER FOR CORN PLANTER.

No. 119,142.    Patented Sep. 19, 1871.

Witnesses:
William Gabler
James Peniwell

Inventor,
Lysander L. Haworth
per Chas P. Mousum
his Attorney

UNITED STATES PATENT OFFICE.

LYSANDER L. HAWORTH, OF DECATUR, ILLINOIS, ASSIGNOR TO HIMSELF, MAHLON HAWORTH, GEORGE D. HAWORTH, AND JAMES W. HAWORTH.

IMPROVEMENT IN CORN-PLANTERS.

Specification forming part of Letters Patent No. 119,142, dated September 19, 1871.

*To all whom it may concern:*

Be it known that I, LYSANDER L. HAWORTH, of Decatur, in the county of Macon and State of Illinois, have invented certain Improvements in Cord-Stop, of which the following is a specification:

My invention relates to a metallic stop to be fastened upon the cord that is used to operate machinery when knots are used upon the cord, such knots working in crotched plates or in notched pulleys, said stop preventing the wear of the knot upon the cord, the stop being so formed that it is readily adjusted upon the cord.

Figure 1:
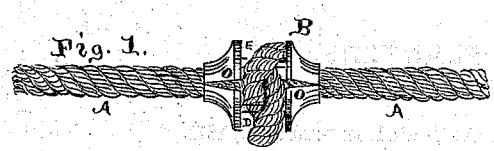
Figure 2:
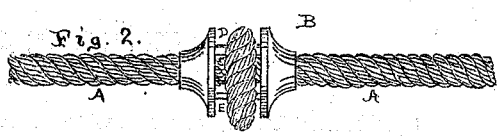
Figure 3:
Figure 4:
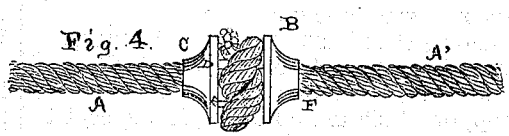
Figure 5:
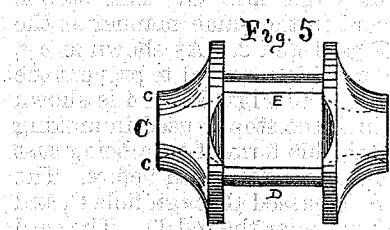
Figure 9:
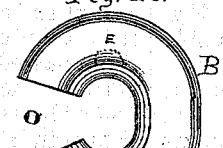
Figure 6:
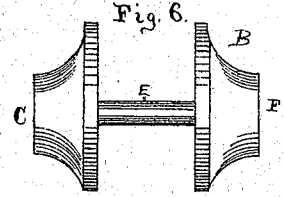
Figure 7:
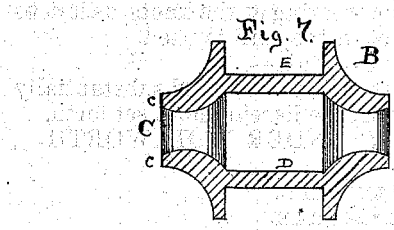
Figures 10, 11:
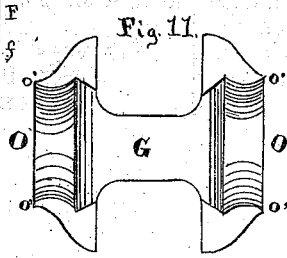
Figure 8:
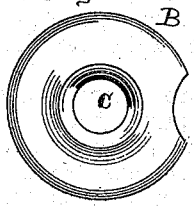

Figure 1 is a side view of stop. Fig. 2 is a reverse view of stop. Fig. 3 is a side view of stop, showing manner of making a splice in the cord. Fig. 4 is a reverse view of Fig. 3. Fig. 5 is an enlarged side view of Fig. 3. Fig. 6 is an enlarged top view of Fig. 3. Fig. 7 is a sectional view of Fig. 3. Fig. 8 is an end view of Fig. 3. Fig. 9 is a side view of stop as cast open. Fig. 10 is an end view of Fig. 9. Fig. 11 is a side view of another form of stop.

The stop, as shown in Figs. 1, 2, 10, and 11, can be fastened to the cord as follows: The cord is passed back of the arm or arms, then brought in front of the arm or arms and crossed, laying the ends of the cord in the openings, when the stop is laid in a swage or die and the openings closed over the cord.

This stop is an improvement on the knotted cord that is used to operate the seed-dropping mechanism of a corn-planter patented September 27, 1864, by John Thompson and John Ramsey, No. 44,472, and of a corn-planter patented February 22, 1870, by George D. Haworth, No. 100,032.

A is the cord, upon which is fastened the metallic stop B. In Figs. 1 and 2 the cord is shown as passing around the arms D E and knotted cord laid in the openings O O, as shown in Figs. 9 and 10; then the stop is hammered so as to close the opening; the cord being stretched when in use, the knots are drawn down on the arms D E, preventing the stop from opening. If a stop should be broken another can be readily put upon the cord. In Fig. 11 is shown a stop cast open, with only a single arm, G. This stop is fastened to the cord in the same manner as the ones shown in Figs. 1 and 2. As shown at $c\ c$, $f\ f$, and $o'\ o'$, the metal is rounded to prevent the wearing of the cord. In Figs. 3 and 4 is shown the manner in which the stop is used in making a splice in the cord, this form of stop being cast without the openings $o\ o$ described before. The end of the cord A is passed through hole C, and in front of and then under the rod D. The cord A' is passed through the hole F, then under the cord A, then in front of and over the rod E, when the ends of the cord are tied together, as shown in Fig. 4. By means of the stop the cord is prevented from wearing at the knots, as it does when only a knot in the cord is used.

I claim as my invention—

The metallic stop B, constructed substantially as and for the purpose hereinbefore set forth.

LYSANDER L. HAWORTH.

Witnesses:
JAMES PENIWELL,
PATRICK GRAHAM.